(12) United States Patent
Nishimura et al.

(10) Patent No.: US 11,307,177 B2
(45) Date of Patent: Apr. 19, 2022

(54) ULTRASONIC FLAW DETECTOR AND ULTRASONIC FLAW DETECTING METHOD FOR COMPOSITE MATERIAL

(71) Applicant: KAWASAKI JUKOGYO KABUSHIKI KAISHA, Kobe (JP)

(72) Inventors: Takehiro Nishimura, Kobe (JP); Mitsuhiro Kamioka, Kobe (JP); Mamoru Nishio, Kobe (JP); Daisuke Watanabe, Kobe (JP); Yousuke Tsumura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 412 days.

(21) Appl. No.: 16/467,527

(22) PCT Filed: Mar. 14, 2017

(86) PCT No.: PCT/JP2017/010188
§ 371 (c)(1),
(2) Date: Jun. 7, 2019

(87) PCT Pub. No.: WO2018/105140
PCT Pub. Date: Jun. 14, 2018

(65) Prior Publication Data
US 2019/0323997 A1    Oct. 24, 2019

(30) Foreign Application Priority Data
Dec. 7, 2016    (JP) .............................. JP2016-237419

(51) Int. Cl.
*G01N 29/44*    (2006.01)
*B61F 1/08*    (2006.01)
(Continued)

(52) U.S. Cl.
CPC .......... *G01N 29/4427* (2013.01); *B61F 1/08* (2013.01); *G01N 29/043* (2013.01);
(Continued)

(58) Field of Classification Search
CPC ............ G01N 29/4427; G01N 29/043; G01N 2291/0231; G01N 2291/0289;
(Continued)

(56) References Cited

U.S. PATENT DOCUMENTS 4,862,383 A   8/1989  Koshimizu et al.
4,953,405 A * 9/1990  Hara .................... G01N 29/075
                                                  73/602

FOREIGN PATENT DOCUMENTS

CN   101672826 A  *  3/2010
CN   105388212 A     3/2016
(Continued)

OTHER PUBLICATIONS

Aug. 4, 2021 Office Action issued in Chinese Patent Application No. 201780075443.9.
(Continued)

*Primary Examiner* — Lisa M Caputo
*Assistant Examiner* — Rose M Miller
(74) *Attorney, Agent, or Firm* — Oliff PLC

(57) ABSTRACT

An ultrasonic flaw detector for a composite material constituted by a plurality of materials which are different in physical properties from one another includes: a section specifier configured to specify first and second sections of an RF signal of a reflected wave of an ultrasonic wave with which the composite material is irradiated, a material reflected wave being possibly generated in the first section, an interface reflected wave being possibly generated in the second section; a material flaw determiner configured to determine whether or not a value of the RF signal exceeds (Continued)

a positive first threshold in the first section; and an interface flaw determiner configured to determine whether or not the value of the RF signal falls below a negative second threshold in the second section.

4 Claims, 4 Drawing Sheets

(51) Int. Cl.
  *G01N 29/04* (2006.01)
  *G01N 29/265* (2006.01)
  *B61F 5/30* (2006.01)
(52) U.S. Cl.
  CPC .............. *G01N 29/265* (2013.01); *B61F 5/30* (2013.01); *G01N 2291/0231* (2013.01); *G01N 2291/0289* (2013.01); *G01N 2291/044* (2013.01); *G01N 2291/269* (2013.01)
(58) Field of Classification Search
  CPC ....... G01N 2291/044; G01N 2291/269; G01N 29/265; B61F 5/30; B61F 1/08
  See application file for complete search history.

(56) References Cited

FOREIGN PATENT DOCUMENTS

| JP | S54-25986 A | 2/1979 | | |
| JP | S62-174653 A | 7/1987 | | |
| JP | 2001-021541 A | 1/2001 | | |
| JP | 2008-233048 A | 10/2008 | | |
| JP | 2009-270824 A | 11/2009 | | |
| JP | 2014202525 A | * 10/2014 | ............ | G01N 29/07 |
| JP | 2015-125008 A | 7/2015 | | |
| WO | WO-2014163022 A1 | * 10/2014 | ............ | G01N 29/07 |

OTHER PUBLICATIONS

Yuan Mio et al. "Structural Connection of Composite Materials". National Defense Industry Publishing Co., Ltd., Apr. 30, 1992, pp. 203-205.

* cited by examiner

ULTRASONIC FLAW DETECTOR AND ULTRASONIC FLAW DETECTING METHOD FOR COMPOSITE MATERIAL

TECHNICAL FIELD

The present invention relates to an ultrasonic flaw detector and ultrasonic flaw detecting method for a composite material constituted by a plurality of materials which are different in physical properties from one another.

BACKGROUND ART

As parts constituting railcars, aircrafts, and the like, parts utilizing a composite material of fiber-reinforced resin (CFRP, GFRP, etc.) have been developed in recent years. A typical example of a nondestructive inspection of inspecting the presence or absence of a flaw in the composite material is an ultrasonic flaw inspection (see PTL 1, for example).

CITATION LIST

Patent Literature

PTL 1: Japanese Laid-Open Patent Application Publication No. 2009-270824

SUMMARY OF INVENTION

Technical Problem

As the flaws of the composite material, there are a material flaw generated inside a material and an interface flaw generated at an interface between different materials. From the viewpoint of inspection efficiency, both the material flaw and the interface flaw are desired to be detected by performing ultrasonic flaw detection once. An ultrasonic wave propagated through the composite material hardly reflects on a flawless material but reflects on an interface even if the interface is flawless. Therefore, a threshold suitable for the determination of the material flaw and a threshold suitable for the determination of the interface flaw are different from each other. If the threshold for the determination of the interface flaw and the threshold for the determination of the material flaw are set to the same value in order to inspect both the material flaw and the interface flaw by performing the ultrasonic flaw detection once, problems occur, i.e., for example, inadequate detection of the material flaws occurs, or erroneous determination of false indications as the interface flaws occurs.

An object of the present invention is to be able to inspect both a material flaw and an interface flaw with a high degree of accuracy by performing ultrasonic flaw detection once.

Solution to Problem

The present inventors have focused on a phenomenon in which when a flaw exists at an interface of a composite material formed by laminating a plurality of materials, and a reflected wave at the time of the ultrasonic flaw detection is an RF signal (not a full wave rectification signal), an absolute value of a negative peak of the interface reflected wave becomes large.

An ultrasonic flaw detector for a composite material according to one aspect of the present invention is an ultrasonic flaw detector for a composite material constituted by a plurality of materials which are different in physical properties from one another. The ultrasonic flaw detector includes: a section specifier configured to specify first and second sections of an RF signal of a reflected wave of an ultrasonic wave with which the composite material is irradiated, a material reflected wave being possibly generated in the first section, an interface reflected wave being possibly generated in the second section; a material flaw determiner configured to determine whether or not a value of the RF signal exceeds a positive first threshold in the first section; and an interface flaw determiner configured to determine whether or not the value of the RF signal falls below a negative second threshold in the second section.

An ultrasonic flaw detecting method for a composite material according to one aspect of the present invention is an ultrasonic flaw detecting method for a composite material constituted by a plurality of materials which are different in physical properties from one another. The ultrasonic flaw detecting method includes: receiving an RF signal of a reflected wave of an ultrasonic wave with which the composite material is irradiated; determining whether or not a value of the RF signal exceeds a positive first threshold in a first section of the RF signal, a material reflected wave being possibly generated in the first section; and determining whether or not the value of the RF signal falls below a negative second threshold in a second section of the RF signal, an interface reflected wave being possibly generated in the second section.

According to the above configuration and method, in the first section in which the material reflected wave is possibly generated, whether or not the material flaw exists is determined by using the positive first threshold. Further, in the second section in which the interface reflected wave is possibly generated, whether or not the interface flaw exists is determined by using the negative second threshold. Therefore, a target region for the determination of the interface flaw in the RF signal is distinguished from a target region for the determination of the material flaw in the RF signal. On this account, even when the ultrasonic flaw detection is performed once, the first threshold for the material flaw determination and the second threshold for the interface flaw determination are individually set, and both the detection accuracy of the material flaw and the detection accuracy of the interface flaw can be improved.

Advantageous Effects of Invention

According to the present invention, both the material flaw and the interface flaw can be inspected with a high degree of accuracy by performing the ultrasonic flaw detection once.

DESCRIPTION OF EMBODIMENTS

Hereinafter, an embodiment will be explained with reference to the drawings.

Ultrasonic Flaw Detector

Figure 1:
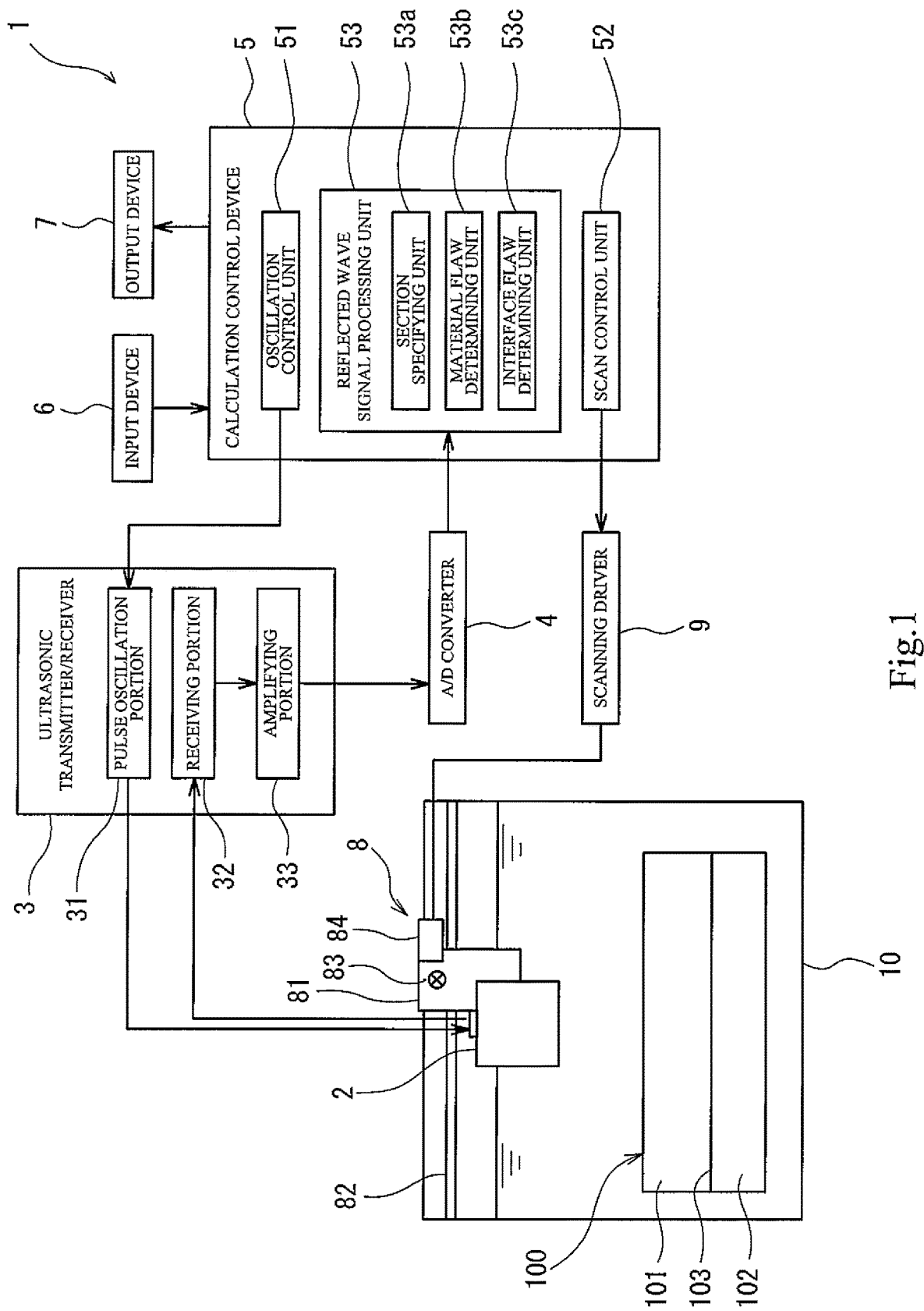
FIG. 1 is a block diagram of an ultrasonic flaw detector according to an embodiment.

FIG. 1 is a block diagram of an ultrasonic flaw detector 1 according to the embodiment. As shown in FIG. 1, the ultrasonic flaw detector 1 performs ultrasonic flaw detection in accordance with an immersion method with an ultrasonic probe 2 immersed in water together with a composite material 100 as an inspection target. Although the immersion method is used in the present embodiment, the ultrasonic flaw detection may be performed by using a different method (for example, a contact method). The ultrasonic flaw detector 1 includes the ultrasonic probe 2, an ultrasonic transmitter/receiver 3, an A/D converter 4, a calculation control device 5, an input device 6, an output device 7, a probe scanner 8, a scanning driver 9, and a water tank 10.

With the ultrasonic probe 2 immersed in water in the water tank 10 together with the composite material 100 formed by laminating a first material 101 and a second material 102, the ultrasonic probe 2 irradiates the composite material 100 with an ultrasonic wave from the first material 101 side and receives a reflected wave of the ultrasonic wave from the composite material 100. The ultrasonic transmitter/receiver 3 is connected to the ultrasonic probe 2. The ultrasonic transmitter/receiver 3 includes a pulse oscillation portion 31, a receiving portion 32, and an amplifying portion 33. The pulse oscillation portion 31 transmits a pulse signal to the ultrasonic probe 2. The receiving portion 32 receives a detection signal (reflected wave signal) of the reflected wave received by the ultrasonic probe 2. The amplifying portion 33 amplifies the reflected wave signal and transmits the signal to the A/D converter 4. The A/D converter 4 receives the analog reflected wave signal from the ultrasonic transmitter/receiver 3, converts the analog reflected wave signal into a digital signal, and outputs the digital signal to the calculation control device 5.

As one example, the probe scanner 8 includes a carrier 81, sliders 82 and 83, and a motor 84. The carrier 81 is displaced in a plane substantially parallel to an interface 103 (joint interface) of the composite material 100. The sliders 82 and 83 guide the carrier 81 in this plane. The motor 84 moves the carrier 81 on the sliders 82 and 83. Driving of the motor 84 is controlled by the scanning driver 9. The ultrasonic probe 2 is fixed to the carrier 81 and is displaced in the plane in accordance with the movement of the carrier 81. The motor 84 is controlled by the scanning driver 9.

The calculation control device 5 includes an oscillation control unit 51, a scan control unit 52, and a reflected wave signal processing unit 53. The input device 6 and the output device 7 are connected to the calculation control device 5. The input device 6 is used when a user inputs information to the calculation control device 5. One example of the input device 6 is a keyboard. The output device 7 is used when a processing result and the like are output from the calculation control device 5. Examples of the output device 7 includes a display and a printer. The calculation control device 5 includes a processor, a volatile memory, a non-volatile memory, an I/O interface, and the like, and the non-volatile memory stores an ultrasonic flaw detection program. To be specific, the processor executes the ultrasonic flaw detection program by using the volatile memory and inputs and outputs signals through the I/O interface according to need to realize the oscillation control unit 51, the scan control unit 52, and the reflected wave signal processing unit 53.

Based on a condition input from the input device 6, the oscillation control unit 51 transmits a pulse generation command to the ultrasonic transmitter/receiver 3. The pulse generation command contains information, such as the frequency and focal position of the ultrasonic wave. Based on the condition input from the input device 6, the scan control unit 52 outputs a target coordinate signal of the carrier 81 to the scanning driver 9. The reflected wave signal processing unit 53 includes a section specifier 53a, a material flaw determiner 53b, and an interface flaw determiner 53c.

The section specifier 53a receives the digital reflected wave signal as an RF signal from the A/D converter 4 and specifies first and second sections of the RF signal. In the first section, a material reflected wave is possibly generated. In the second section, an interface reflected wave is possibly generated. By threshold determination in the first section, the material flaw determiner 53b determines whether or not the material flaw exists. By threshold determination in the second section, the interface flaw determiner 53c determines whether or not the interface flaw exists.

Reflected Wave

Figure 2:
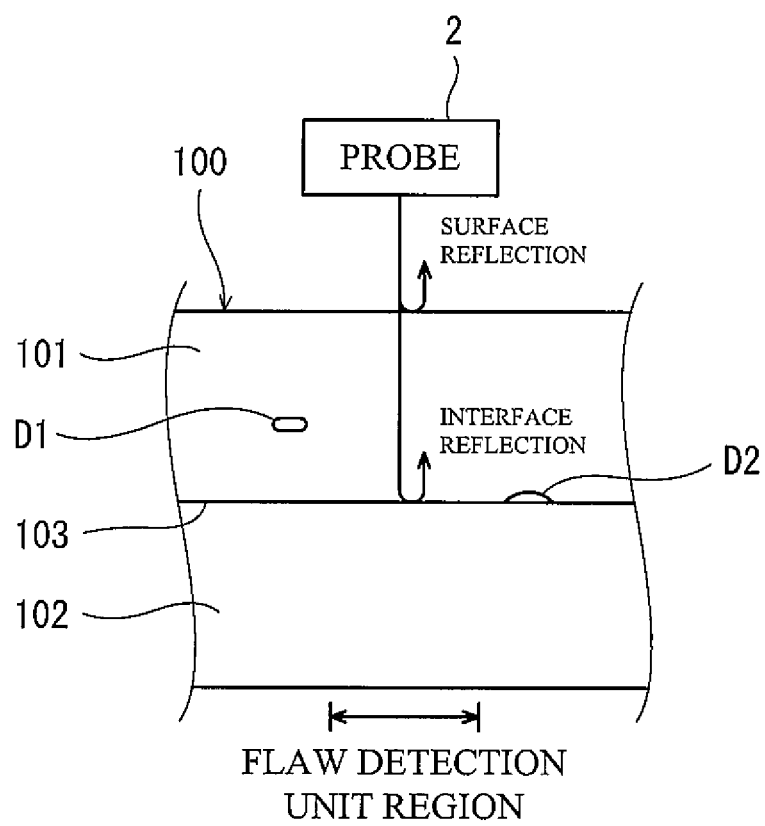
FIG. 2 is a diagram for explaining a reflected wave at the time of an ultrasonic flaw detection.

FIG. 2 is a diagram for explaining the reflected wave at the time of the ultrasonic flaw detection. As shown in FIG. 2, for example, the composite material 100 is formed by laminating the first material 101 made of CFRP and the second material 102 made of GFRP, and the interface 103 (joint interface) is formed between the first material 101 and the second material 102. The ultrasonic probe 2 irradiates the composite material 100 with the ultrasonic wave from the first material 101 side at a desired flaw detection point (flaw detection unit region) of the composite material 100.

In this case, first, part of the ultrasonic wave reflects on the surface of the first material 101. The reflected wave at this time is referred to as a "surface reflected wave." Next, part of the ultrasonic wave incident on the first material 101 reflects on the interface 103 located between the first material 101 and the second material 102. The reflected wave at this time is referred to as an "interface reflected wave." The surface reflected wave and the interface reflected wave are generated even when the composite material 100 is flawless.

When a material flaw D1 (for example, a void) exists in the flaw detection unit region at the first material 101, part of the ultrasonic wave propagated through the first material 101 reflects on the material flaw D1. The reflected wave at this time is referred to as a "material reflected wave." When an interface flaw D2 (for example, separation) exists in the flaw detection unit region at the interface 103, the amplitude of the interface reflected wave becomes larger than that when the interface is flawless. A time point at which the interface reflected wave reaches the ultrasonic probe 2 and a time point at which the material reflected wave reaches the ultrasonic probe 2 are different from each other. Therefore, regarding the reflected waves obtained by performing the ultrasonic flaw detection once, the material reflected wave and the interface reflected wave are distinguishable by the time. Such ultrasonic flaw detection is performed for each of the flaw detection unit regions provided at a predetermined pitch.

Flaw Determination

Figure 3:
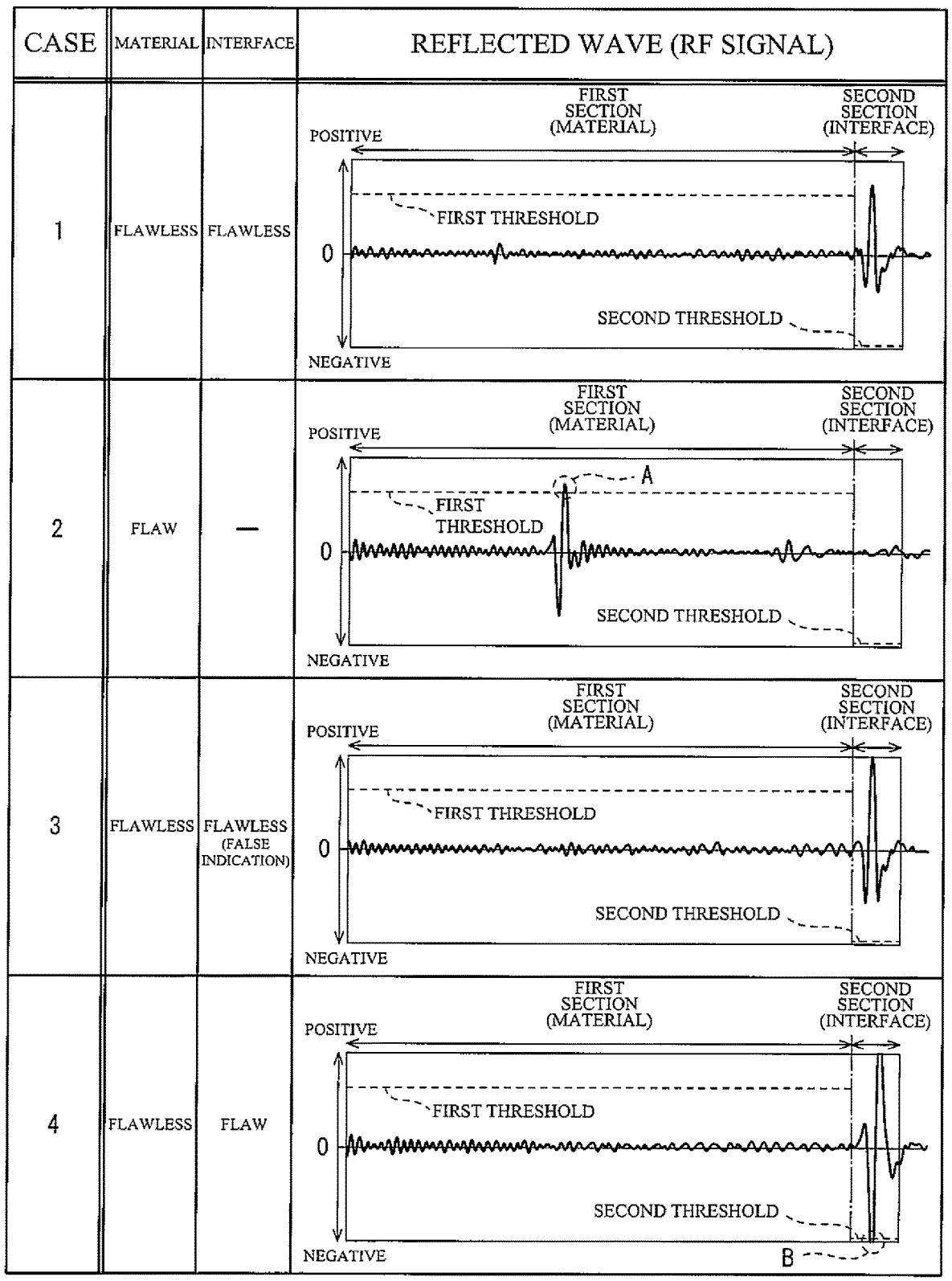
FIG. 3 is a diagram for explaining a flaw determination performed by the ultrasonic flaw detector shown in FIG. 1.

FIG. 3 is a diagram for explaining a flaw determination performed by the ultrasonic flaw detector 1 shown in FIG. 1. Graphs in FIG. 3 show the RF signals of the reflected waves, the RF signals being received by the reflected wave signal processing unit 53 of the calculation control device 5 and shown as time-base waveforms. To be specific, in the graphs of FIG. 3, a horizontal axis shows a time, and a vertical axis shows a reflected wave height (echo height). According to the reflected waves of the time-base waveforms, the waveform of the surface reflected wave, the waveform of the material reflected wave (when the material flaw exists), and the waveform of the interface reflected wave appear in this order as time passes.

As shown in FIGS. 1 and 3, the section specifier 53a specifies, as the first section (material section), a time range which is included in the RF signal of the reflected wave obtained by performing the ultrasonic flaw detection once and in which the material reflected wave is possibly generated. The section specifier 53a also specifies, as the second section (interface section), a time range which is included in the above RF signal and in which the interface reflected wave is possibly generated. To be specific, the first section and the second section are different sections which do not overlap each other in terms of time. The first section and the second section can be specified by calculation based on the thickness of the first material 101, the propagation velocity of the ultrasonic wave, and the like.

The material flaw determiner 53b determines whether or not the value of the RF signal of the reflected wave exceeds a positive first threshold in the first section. The interface flaw determiner 53c determines whether or not the value of the RF signal of the reflected wave falls below a negative second threshold in the second section. To be specific, the positive first threshold is set in the first section but is not set in the second section. As one example, an absolute value of the second threshold is larger than the first threshold. When the material flaw determiner 53b determines that the value of the RF signal of the reflected wave exceeds the first threshold (positive value) in the first section, the material flaw determiner 53b determines that the material flaw exists. When the interface flaw determiner 53c determines that the value of the RF signal of the reflected wave falls below the second threshold in the second section, the interface flaw determiner 53c determines that the interface flaw exists.

In Case 1 of FIG. 3, the value of the RF signal of the reflected wave does not exceed the first threshold (positive value) in the first section, and therefore, the material flaw determiner 53b determines that the material flaw does not exist, and the first material 101 is flawless. Further, the value of the RF signal of the reflected wave does not fall below the second threshold (negative value) in the second section, and therefore, the interface flaw determiner 53c determines that the interface flaw does not exist, and the interface 103 is flawless. To be specific, although the value of the RF signal of the reflected wave in the second section exceeds the same value as the first threshold, the first threshold (positive value) is not set in the second section, so that the positive peak of the reflected wave of the flawless interface is not erroneously determined as the interface flaw.

In Case 2 of FIG. 3, the value of the RF signal of the reflected wave exceeds the first threshold (positive value) in the first section (see a portion "A" in FIG. 3), and therefore, the material flaw determiner 53b determines that the material flaw exists. When the material flaw exists at the first material 101, the ultrasonic wave does not adequately reach the interface 103, so that the interface reflected wave is not evaluated.

In Case 3 of FIG. 3, the value of the RF signal of the reflected wave does not exceed the first threshold (positive value) in the first section, and therefore, the material flaw determiner 53b determines that the material flaw does not exist, and the first material 101 is flawless. In the second section, although the interface 103 is flawless, the peak value of the RF signal of the reflected wave is large for some reason, i.e., false indication occurs. At this time, the absolute value of the second threshold is set to be a value smaller than the positive peak value of the RF signal of the interface reflected wave. The RF signal of the interface reflected wave has such a property that the absolute value of the negative peak value becomes smaller than the positive peak value. On this account, the value of the RF signal of the reflected wave does not fall below the second threshold (negative value), and therefore, the interface flaw determiner 53c determines that the interface flaw does not exist, and the interface 103 is flawless.

In Case 4 of FIG. 3, the value of the RF signal of the reflected wave does not exceed the first threshold (positive value) in the first section, and therefore, the material flaw determiner 53b determines that the material flaw does not exist, and the first material 101 is flawless. On the other hand, the value of the RF signal of the reflected wave falls below the second threshold (negative value) in the second section (see a portion "B" in FIG. 3), and therefore, the interface flaw determiner 53c determines that the interface flaw exists. The positive peak value of the RF signal of the interface reflected wave is located outside a screen display range due to the false indication, but this does not matter since the determination based on the positive threshold is not performed.

Application Example

Figure 4:
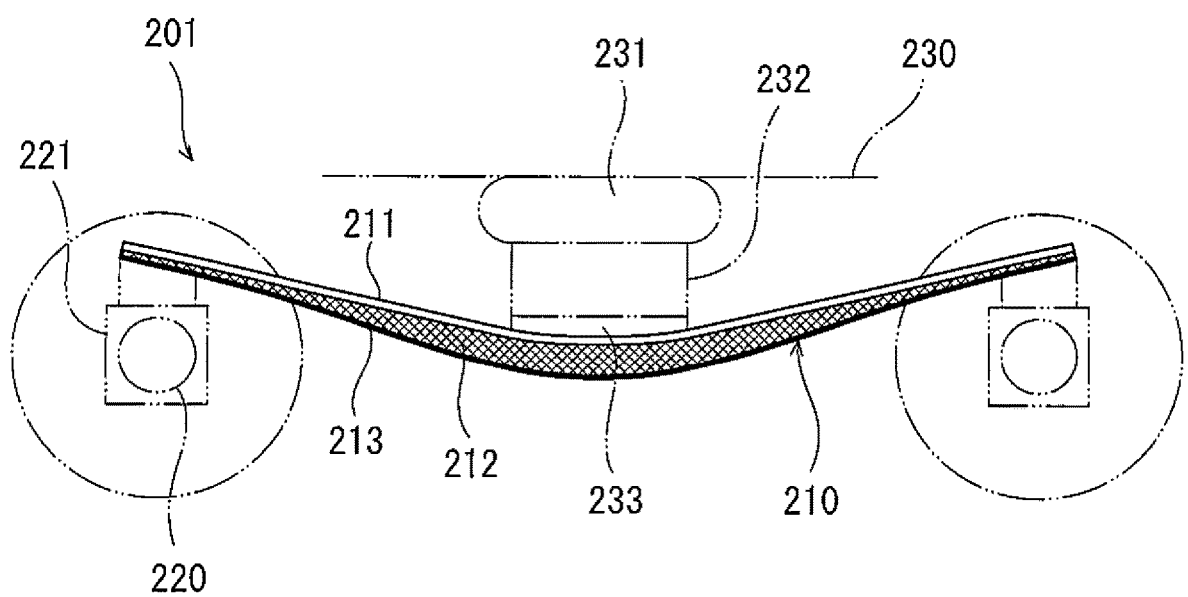
FIG. 4 is a side view of a railcar bogie including a plate spring made of a composite material that is a target of the ultrasonic flaw detection.

FIG. 4 is a side view of a railcar bogie 201 including a plate spring 210 made of a composite material as a target of the ultrasonic flaw detection. As shown in FIG. 4, the bogie 201 includes a cross beam 232 (bogie frame) and axle boxes 221. The cross beam 232 (bogie frame) supports a carbody 230 through an air spring 231. Each of the axle boxes 221 accommodates a bearing (not shown) which rotatably supports an axle 220. The plate spring 210 extends between the cross beam 232 and the axle boxes 221 in a car longitudinal direction. A middle portion of the plate spring 210 supports the cross beam 232, and both end portions of the plate spring 210 are supported by the axle boxes 221.

The plate spring 210 has a three-layer structure including an upper layer 211, an intermediate layer 212, a lower layer 213. For example, the upper layer 211 and the lower layer 213 are formed by CFRP, and the intermediate layer 212 is formed by GFRP. When these layers 211 to 213 are applied to the example shown in FIG. 2, the upper layer 211 and the lower layer 213 correspond to the first material, and the intermediate layer 212 corresponds to the second material. The plate spring 210 is formed such that the thickness thereof gradually increases from an end portion thereof toward a middle portion thereof. Specifically, the intermediate layer 212 is formed such that the thickness thereof gradually increases from an end portion thereof toward a middle portion thereof, and the thickness of the upper layer 211 and the thickness of the lower layer 213 are constant.

In order to inspect the material flaw of the upper layer 211 (or the lower layer 213) and the interface flaw between the upper layer 211 (or the lower layer 213) and the intermediate layer 212, the above-described ultrasonic flaw detection is suitably performed with respect to the plate spring 210. At this time, the ultrasonic wave from the ultrasonic probe 2 is incident on the plate spring 210 from the upper layer 211 side (or the lower layer 213 side).

According to the above configuration, in the first section in which the material reflected wave is possibly generated, whether or not the material flaw exists is determined by using the positive first threshold. Further, in the second section in which the interface reflected wave is possibly generated, whether or not the interface flaw exists is determined by using the negative second threshold. Therefore, a target region for the determination of the interface flaw in the RF signal is distinguished from a target region for the determination of the material flaw in the RF signal. On this account, even when the ultrasonic flaw detection is performed once, the first threshold for the material flaw determination and the second threshold for the interface flaw determination are individually set, and both the detection accuracy of the material flaw and the detection accuracy of the interface flaw can be improved.

Since the absolute value of the second threshold is larger than the first threshold, both inadequate detection of the material flaws and erroneous determination of the interface flaws due to false indications can be prevented. It should be noted that the absolute value of the second threshold may be a value smaller than the first threshold. Further, since the first threshold is set to a value smaller than the positive peak value of the reflected wave of the flawless interface, the inadequate detection of the material flaws can be further suitably prevented. It should be noted that the first threshold may be set to a value larger than the positive peak of the reflected wave of the flawless interface. Since the negative peak value of the reflected wave of the flawless interface can be set to a value that is small with respect to a display limit, the margin of sensitivity to the display limit is generated. Therefore, without using a highly functional apparatus, the material flaw and the interface flaw can be inspected with a high degree of accuracy by performing the ultrasonic flaw detection once. In addition, since the margin of sensitivity is generated, the range of a detectable flaw dimension can be widened.

REFERENCE SIGNS LIST 1 ultrasonic flaw detector
53a section specifier
53b material flaw determiner
53c interface flaw determiner
100 composite material
101 first material
102 second material
103 interface
210 plate spring
D1 material flaw
D2 interface flaw

The invention claimed is:

1. An ultrasonic flaw detector for a composite material, the composite material including a first material made of CFRP, a second material made of GFRP, and an interface disposed between the first material and the second material, each of the first material, the second material, and the interface having different physical properties from one another, the composite material formed by laminating the first material and the second material, the ultrasonic flaw detector comprising:
   a section specifier configured to specify first and second sections of an RF signal of a reflected wave of an ultrasonic wave with which the composite material is irradiated, a material reflected wave being generated in the first section, an interface reflected wave being generated in the second section, the interface reflected wave having a positive peak and a negative peak when an interface flaw exists at the interface;
   a material flaw determiner being configured to determine whether or not a material flaw exists by determining whether or not a value of the RF signal exceeds a positive first threshold in the first section; and
   an interface flaw determiner being configured to determine whether or not the interface flaw exists only by determining whether or not the value of the RF signal falls below a negative second threshold in the second section, the negative second threshold being a negative value less than 0, wherein
   the ultrasonic flaw detector is configured to cause an ultrasonic transmitter to irradiate the composite material from a first material side of the composite material so that the positive peak and the negative peak of the interface reflected wave are generated when the interface flaw exists at the interface.

2. The ultrasonic flaw detector according to claim 1, wherein an absolute value of the second threshold is larger than the first threshold.

3. An ultrasonic flaw detecting method for a composite material, the composite material including a first material made of CFRP, a second material made of GFRP, and an interface disposed between the first material and the second material, each of the first material, the second material, and the interface having different physical properties from one another, the composite material formed by laminating the first material and the second material, the ultrasonic flaw detecting method comprising:
   irradiating the composite material from a first material side of the composite material with an ultrasonic wave so that a reflected wave of the ultrasonic wave includes an interface reflected wave, the interface reflected wave having a positive peak and a negative peak when an interface flaw exists at the interface;
   receiving an RF signal of the reflected wave;
   determining whether or not a material flaw exists by determining whether or not a value of the RF signal exceeds a positive first threshold in a first section of the RF signal, a material reflected wave being generated in the first section when a flaw exists in the composite material; and
   determining whether or not the interface flaw exists by determining whether or not the value of the RF signal falls below a negative second threshold in a second section of the RF signal, the interface reflected wave being generated in the second section when the interface flaw exists, the negative second threshold being a negative value less than 0.

4. The ultrasonic flaw detecting method according to claim 3, wherein:
   the composite material further includes a third material made of CFRP, and
   the composite material is a railcar plate spring having a three-layer structure in which the second material is sandwiched between the first material and the third material.

* * * * *